(12) United States Patent
Caddaye et al.

(10) Patent No.: US 6,178,856 B1
(45) Date of Patent: Jan. 30, 2001

(54) LATHES

(76) Inventors: Robert John Caddaye; Marilyn Jeanette Caddaye, both of 21 Woodlands Road, Cranbourne South, Victoria 3977 (AU)

(*) Notice: Under 35 U.S.C. 154(b), the term of this patent shall be extended for 0 days.

(21) Appl. No.: 09/259,775

(22) Filed: Mar. 1, 1999

Related U.S. Application Data (63) Continuation-in-part of application No. 08/915,025, filed on Aug. 20, 1997, now abandoned, which is a continuation of application No. PCT/AU96/00090, filed on Feb. 22, 1996.

(30) Foreign Application Priority Data

Feb. 22, 1995 (AU) .................................................. PN 1291
Nov. 24, 1995 (AU) .................................................. PN 6784

(51) Int. Cl.$^7$ .......................... B23B 17/00; B23B 19/00; B23B 23/00; B27C 7/02
(52) U.S. Cl. ................................ 82/117; 82/142; 82/148; 82/149; 142/1; 279/3
(58) Field of Search ........................... 142/1, 55; 82/117, 82/142, 148, 149, 158; 29/27 R; 279/3; 403/377

(56) References Cited

U.S. PATENT DOCUMENTS

| 172,679 | * | 1/1876 | Williamson | 82/149 |
|---|---|---|---|---|
| 491,236 | * | 2/1893 | Catchpole | 142/1 |
| 1,319,645 | * | 10/1919 | Clement | 82/142 |
| 1,876,992 | * | 9/1932 | MacCleod | 82/142 |
| 2,051,662 | * | 8/1936 | Wells | 82/117 |
| 2,852,264 | * | 9/1958 | Granata | 279/3 |
| 3,449,001 | * | 6/1969 | Mullion | 279/3 |
| 4,766,788 | * | 8/1988 | Yashiki et al. | 279/3 |
| 5,186,087 | * | 2/1993 | McCormack | 142/1 |
| 5,445,052 | * | 8/1995 | Nichols, Jr. | 142/55 |
| 5,823,699 | * | 10/1998 | Austin, Jr. et al. | 403/377 |

OTHER PUBLICATIONS

The Woodturners Catalog, Craft Supplies USA, pp. 2 and 9, 1992.*
"The Lathe Book", by Ernie Conover. Newtown, CT: The Taunton Press, pp. 4 and 5, 1993.*
Packard Woodworks Catalog, p. 15, 1994.*

* cited by examiner

*Primary Examiner*—Steven C. Bishop
(74) *Attorney, Agent, or Firm*—Thomas R. Vigil

(57) ABSTRACT

The present invention therefore provides in one aspect a lathe including:
a headstock comprising a lathe spindle;
a tailstock; and
a lathe bed wherein the lathe bed is mounted to be rotatable in a horizontal plane about a vertical axis.

In a second aspect of the invention there is provided a lathe including:
a headstock comprising a lathe spindle passing through a hollow column and within the hollow column means adapted to safely connect a vacuum to the interior of the lathe spindle;
a tailstock; and
a lathe bed wherein the lathe bed is mounted to be rotatable in a horizontal plane about a vertical axis.

In a third aspect of the invention there is provided a lathe including:
a headstock comprising a lathe spindle passing through a hollow column and within the hollow column means adapted to safely connect a vacuum to the interior of the lathe spindle;
a lathe bed wherein the bed is mounted to be rotatable in a horizontal plane about a vertical axis; and
a tailstock adapted to rotate 360° through its normal central location to permit alignment with the headstock spindle axis regardless of angular location of the lathe bed about its vertical axis.

44 Claims, 7 Drawing Sheets

LATHES

CROSS-REFERENCE TO RELATED APPLICATIONS

This application is a Continuation-In-Part Application of U.S. application Ser. No. 08/915,025 filed Aug. 20, 1997, now abandoned, which is a continuation of PCT Application No. PCT/AU 96/00090 filed Feb. 22, 1996, which claimed priority under 35 U.S.C. §119 from Australian Patent Application No. PN 1291 filed Feb. 22, 1995 and Australian Patent Application No. PN 6784 filed Nov. 24, 1995.

FIELD OF THE INVENTION

This invention relates to lathes.

BACKGROUND TO THE INVENTION

There is a need to provide a lathe having multiple adaptability for various uses but in particular for use in wood turning although the lathe of the present invention may be used in respect of other operations with respect to other materials such as metals and composite materials.

Lathes and cutting machines are known for turning rotationally symmetrical elements such as wooden spindles or balustrades. Generally a work piece is mounted in chucks and is spun and a knife or set of knives are urged towards the work piece causing wood outside the desired profile to be chipped away.

Wood lathes are known, and most lathes are cast having a fixed bed, a headstock and a tailstock. There have been known lathes hat beds which can be raised or lowered, and moved towards or away from a headstock along a centreline axis between a headstock and a tailstock. Indeed it has been known for a lathe to include a rotatable headstock and even beds capable of translatory movement.

Despite advances in the art of the type mentioned there remain practical disadvantages. For example, prior art lathes do not enable an operator to effectively and safely gain access to all surfaces of an article to be worked on. One attempt to address this problem has involved manually transferring an article to be worked on to a reverse side of a headstock. While this may allow an operator working access to a backside of an article to be worked on, further practical problems arise because in the reverse position an operator will be required to work left handed as a spindle is effectively rotating in an opposite direction. Further attempts to overcome this problem have involved a rotatable headstock, however this type of arrangement still requires an operator to substantially change position and can adversely interfere with vacuum hoses and attachments connected thereto.

Further disadvantages of the prior art lathes include an inability to enable efficient turning of a large blank. In particular if a headstock is able to be rotated to accommodate a large blank, the tailstock cannot be properly brought into an alignment position. In this situation the blank is not properly supported not is it safely balanced. As a result significant vibrations will occur in prior act lathes which are hazardous for lathe operators.

In U.S. Pat. No. 491,236 there is disclosed translatory movement of a bed section, however translatory movement precludes any use of a tailstock to help support heavy or bulky work which must therefore be carried on spindle bearing alone.

It is generally a desirable characteristic of prior art lathes to provide a means of attaching an article to be worked on to a faceplate so as to minimise or prevent marks on articles created by conventional fastening means. Prior art lathes have at least in part addressed this desire by means of applying vacuum although occupational health and safety issues associated therewith still require improvement.

In U.S. Pat. No. 2,852,264 there is disclosed a vacuum chuck which enables a vacuum source to be connected to a faceplate via a swivel connection mated with a spindle bore of a lathe by a tapered plug. This type of arrangement is potentially very dangerous since if there is even any slight imbalance or misalignment the vacuum tubing connected to the lathe spindle can be dislodged. At relatively high rates of spindle rotation any dislodgement of vacuum tubing at such high rates may well be fatal to an operator.

U.S. Pat. No. 5,445,052 provides a vacuum chuck for a lathe. In particular this vacuum chuck incorporates a rotary vacuum coupling connected to a vacuum pump which is attached to an outer end of a vacuum tube located centrally within a spindle bore. In many instances this type of attachment is extremely unsafe because it relies on an external rotating extension of a spindle to permit use of a commercially available rotary union to provide the means of inducing vacuum through the spindle to a chuck.

Finishing and polishing operations usually carried out on a vacuum plate type chuck are made at relatively high spindle RPM (800–2000 RPM) and at such speeds a hose can cause severe injury or death if this rotary union seizes up causing the hose to break off and rotate in a whip like manner.

This type of accident is known to have occurred add The Nichols Jnr. invention does not show otherwise.

The Omega vacuum invention provides for a safe internally enclosed method of inducing a vacuum or partial vacuum through the lathe spindle without additional moving parts, and can operate at speeds of 3000 RPM or more without, damage or safety problems.

The present invention seeks to ameliorate one or more of the problems of the prior art.

The present invention seeks to overcome those problems by providing a universal lathe machine which will substantially enable an operator to gain working access to all surfaces of an object without having to manually move the object, as well as enabling turning of large blanks while a machine remains safely in balance.

A further object of the invention is to provide a modified vacuum induction system which substantially improves occupational health and safety standards over the prior art lathe machines.

SUMMARY OF THE INVENTION

There has been a long felt need in the art of lathes and woodturning to provide a universal lathe which will enable an operator safe working access to all surfaces of a workpiece. At the same time it is desirable to address issues of affordability and durability of lathe equipment.

The present invention therefore provides in one aspect a lathe including:
a headstock comprising a lathe spindle;
a tailstock; and
a lathe bed wherein the lathe bed is mounted to be rotatable in a horizontal plane about a vertical axis.

In a second aspect of the invention there is provided a lathe including:
a headstock comprising a lathe spindle passing through a hollow column and within the hollow column means adapted to safely connect a vacuum to the interior of the lathe spindle;

a tailstock; and a lathe bed wherein the lathe bed is mounted to be rotatable in a horizontal plane about a vertical axis.

In a third aspect of the invention there is provided a lathe including:

a headstock comprising a lathe spindle passing through a hollow column and within the hollow column means adapted to safely connect a vacuum to the interior of the lathe spindle;

a lathe bed wherein the bed is mounted to be rotatable in a horizontal plane about a vertical axis; and a tailstock adapted to rotate 360° through its normal central location to permit alignment with the headstock spindle axis regardless of angular location of the lathe bed about its vertical axis.

PREFERRED ASPECTS OF THE INVENTION

Preferably the lathe bed is manufactured in two symmetrical longitudinal halves which are bolted or welded together.

The lathe bed is preferably slidably affixed to a rotatable turntable. Preferably the lathe bed can be rotated up to 360° in a horizontal plane about a vertical axis and can also be moved towards or away from the headstock. In this way larger blanks can be readily accommodated.

Preferably the lathe bed contains a centrally located groove along its length forming a track in which a tailstock and tool rest can be slidably moved or rotated therein in a horizontal plane about a vertical axis.

Preferably the tailstock is able to be slidably moved in both a forward and backward direction along the lathe bed and is rotatable about a vertical axis within the lathe bed. More preferably the tailstock can be swivelled and realigned with the headstock so as to maintain a central working axis.

In this way direct alignment along a working axis between the headstock and tailstock can be maintained despite the position of the lathe bed in relation thereto.

The lathe can preferably contain an auxiliary bed positioned to one side of the headstock. The auxiliary bed has a similar cross sectional configuration to the lathe bed so that moveable components such as the tool rest can be moved along and repositioned therein. In this way a lathe operator can work on all surfaces of an object without having to remove the object from the headstock.

Preferably the auxiliary bed can be mounted on the lathe bed.

The lathe of the invention also includes a tool rest. The tool rest is lockably held in relative position to a tool slide. The tool rest comprises a shank which is engaged within a tool slide wherein the tool slide can be moved along the track in the lathe bed and is able to be clamped into position. The height and angle of the tool rest can be adjusted by a clamping arrangement. When the clamping arrangement is in a loosened position the tool rest can swivel and its height adjusted to an operators desired working position and tightened.

It is preferred that a predetermined height and angular adjustment of the tool rest relative to the tool slide and/or work axis is accomplished by a series of annular grooves around the shank part of the tool rest which grooves serve to engage a simple spring loaded retaining plate. The height of the tool rest can be altered by releasing the retaining plate and repositioning the retaining plate.

In a specific embodiment the lathe of the present invention preferably contains a vacuum induction system so as to provide improved support for an object to be worked on.

Preferably a vacuum source is selected from a domestic vacuum cleaner or positive displacement vacuum.

Preferably a vacuum source is connected to the headstock via an vacuum inlet port.

Preferably the vacuum inlet port is cast into the headstock.

Preferably the vacuum inlet port consists of an annular groove or chamber.

Preferably the lathe spindle contains a cross hole at right angles through the spindle. In this way the vacuum can be applied to a faceplate via cross holes incorporated in the hollow spindle. Preferably a bleed hole is fitted into the outer end of the lathe spindle.

In order to apply the vacuum in this way it is preferred that one end of the hollow spindle is closed and when necessary to maintain control of the vacuum air can be bled by partially opening this end.

Preferably when a vacuum source is applied to the inlet-port on the headstock, the bleed hole in the spindle is blocked by a conventional plug. In this instance when vacuum is required to be bled the plug is simply moved so as to create a slight air escape.

Preferably the spindle is provided on its outer housing surfaces surrounding the annular vacuum chamber with seals on both sides.

Preferably the seals comprise a teflon annular disc.

Preferably limited bleed of vacuum is provided via the seal surfaces on the outer surface of the spindle. Without wishing to be bound by theory, in this embodiment there is no actual contact of the seal on the spindle thereby creating an air bearing. An air bearing of this type enables very high spindle rotation in excess of 3500 RPM without any mechanical contact of rotating spindle and seal.

The advantages of the vacuum induction system are all vacuum hoses are now retained within the headstock thereby improving safety features over the existing art.

In addition the vacuum system described requires no contact between metal components thereby enhancing component durability.

Preferably there is provided a lathe comprising a first column, a head stock mounted to the fit column, a second column, a bed mounted to the second column, a tail stock mounted to the bed, means connecting the first and second columns, and wherein the bed is mounted to the second column to be rotatable in a horizontal plane about a vertical axis.

Preferably the bed is adapted to be rotated as aforesaid over at least 90°, more preferably over at least 180°, still more preferably over at least 270° and most preferably over at least 360°.

Preferably the bed is mounted to move translationally in said horizontal plane preferably in line with the spindle longitudinal axis.

Preferably the bed is mounted to move translationally in said horizontal plane towards and away from the first column.

Preferably the first column is provided with locating means adapted to locate the bed in a particular relation to the first column.

Preferably the bed is mounted to the second column by mounting means adapted to rotate about a vertical axis.

Preferably releasable means is provided to hold the bed mounting means in a selected rotated position about the vertical axis.

Preferably the bed mounting means comprises guides for guiding the bed in such translational movement.

Preferably releasable means is provided to hold the bed against such translational movement.

Preferably an auxiliary bed is provided which can be mounted to the first mentioned bed.

Preferably the auxiliary bed can be mounted to extend at about right angles to the length of the first mentioned bed.

Preferably an auxiliary bed is provided which can be mounted to the first column.

Preferably the auxiliary bed can be mounted to the headstock and extend at about right angles to a plane including the head stock.

Preferably the auxiliary bed can be mounted on the headstock or lathe bed to extend along an axis parallel with the centreline of the headstock.

Preferably the auxiliary bed can be mounted on the existing lathe bed.

Preferably the first column is demountable from the means connecting the first column and the second column.

Preferably a stand is provided to which the means connecting the first column and the second column is demountably attached.

Preferably the lathe spindle has means for controlling the, vacuum therewithin.

Specific embodiments of lathes in accordance with this invention will now be described by way of non-limiting example.

DETAILED DESCRIPTION WITH RESPECT TO THE DRAWINGS

In various of the drawings is shown a lathe 1 which comprises a base member 2. The base member 2 serves to connect together a fist column 3 and a second column 4 together with a bracing member 6.

The first column 3 is demountable with respect to the base member and carries an electric motor 7 and a lathe head stock 8.

The first column also carries a demountable auxiliary bed 9 which extends outwardly from it, or parallel to the spindle centreline axis.

On the second column is a rotatable turntable 21 which will be described in greater detail hereafter. That rotatable turntable 21 carries a lathe bed 22 on which is mounted a tail stock 23.

The turntable 21 enables the lathe bed 22 to be rotated in various positions and to be translated such as is shown in FIGS. 1, 2, 3 and 4.

Figure 3:
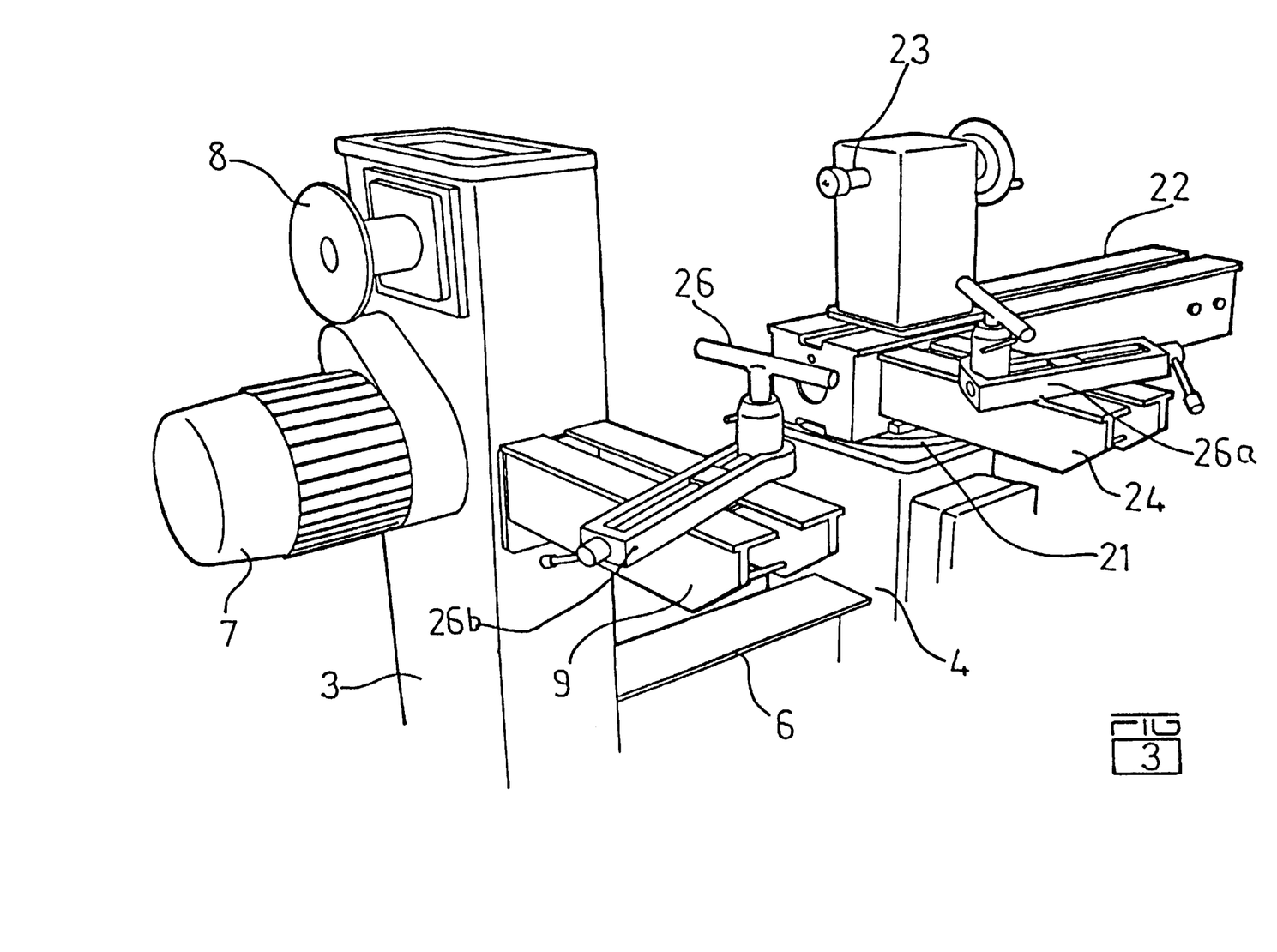
FIG. 3 is an isometric view of the lathe in another condition.
Figure 4:
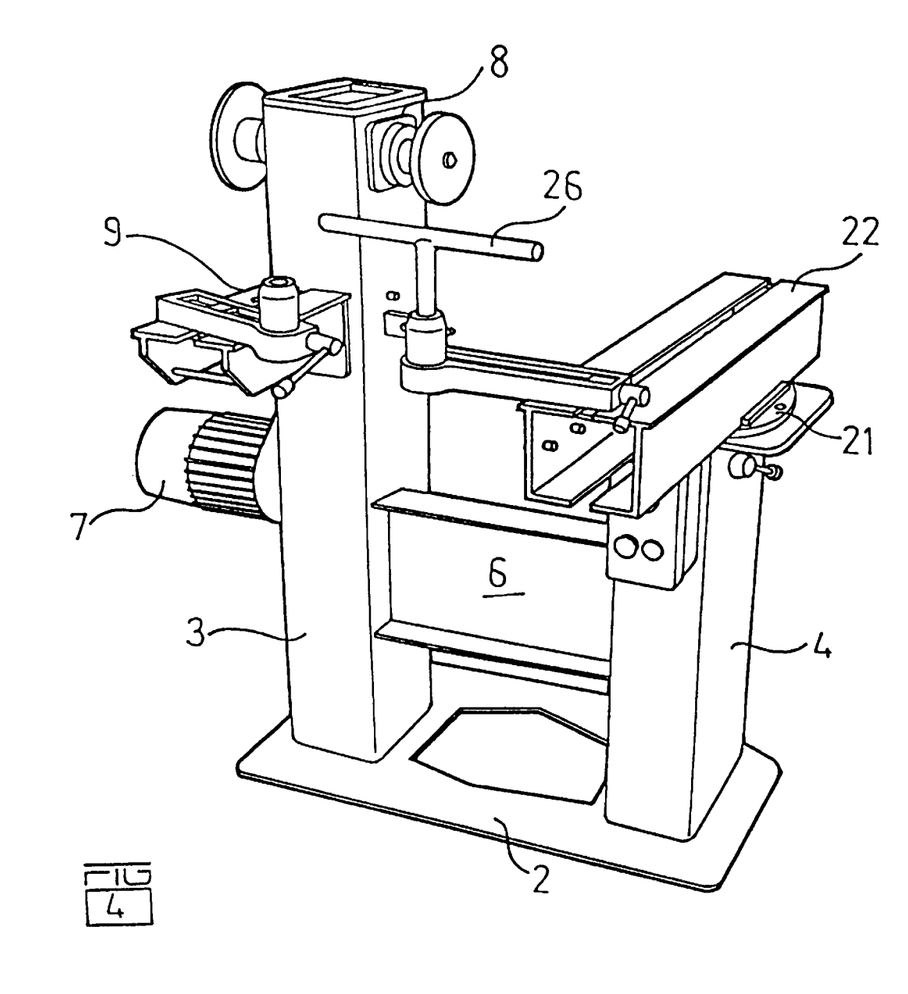
FIG. 4 is an isometric view of the lathe in another condition.

An auxiliary bed 24 is also demountably detached to the bed 22 as is shown in FIG. 3 and may carry a tool rest 26.

Figure 1:
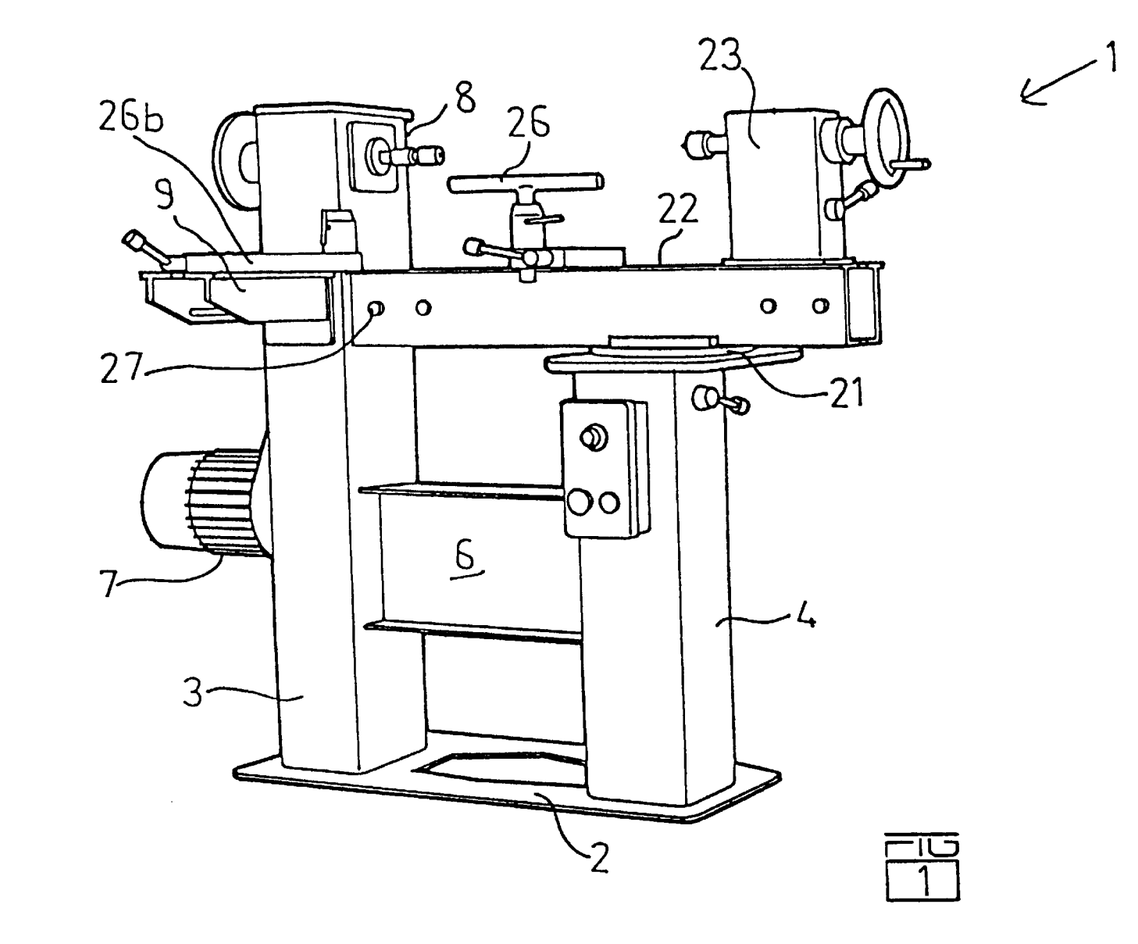
FIG. 1 is an isometric view of a lathe in one condition.
Figure 2:
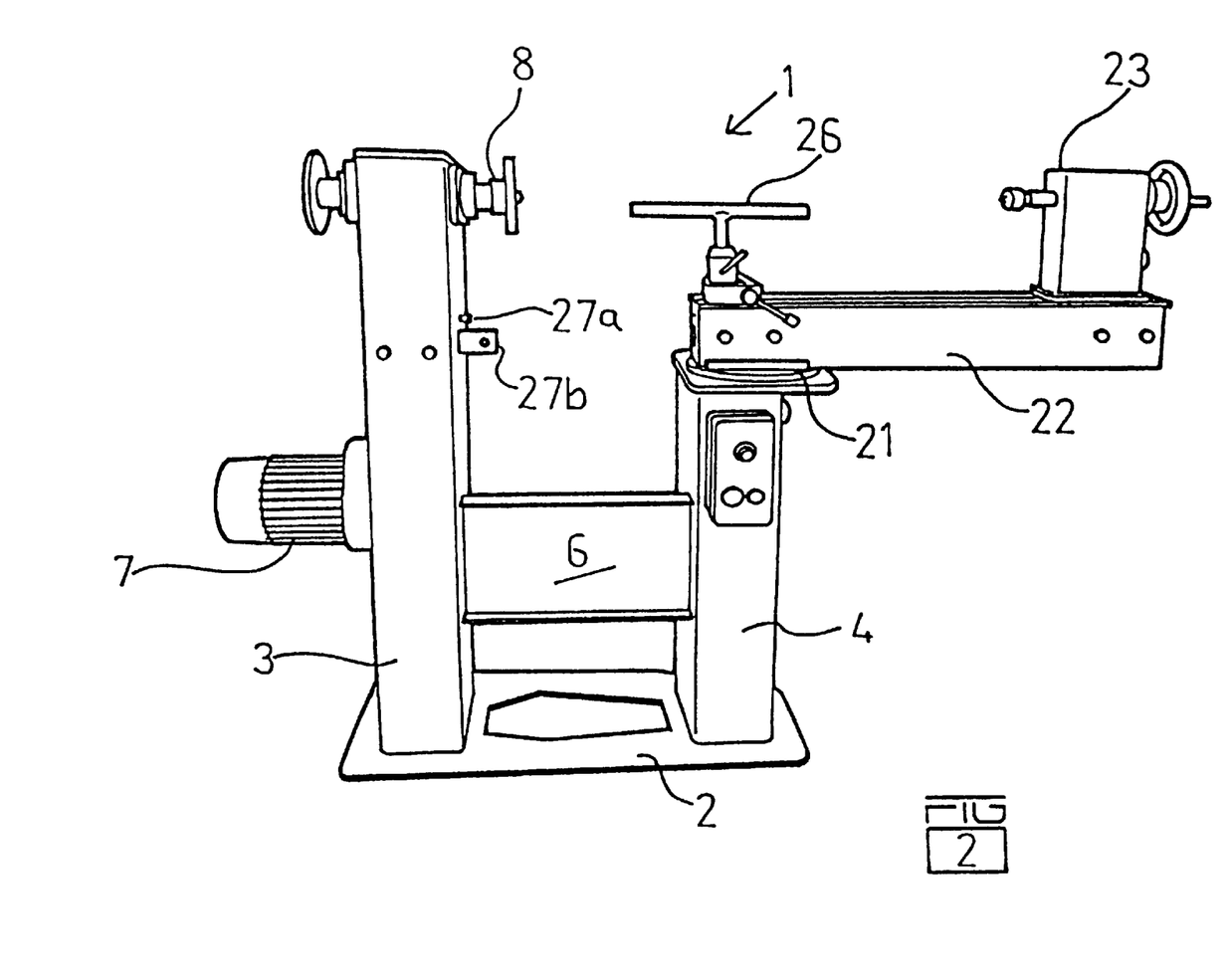
FIG. 2 is an isometric view of the lathe in another condition.

The lathe bed 22 may be opened up as is shown in FIG. 2 or may be closed to be adjacent to the first column as is shown in FIG. 1.

FIG. 2 shows a locating dowel 27a on the first column which will assist in locating the bed when it is closed up to the first column.

Figure 5:
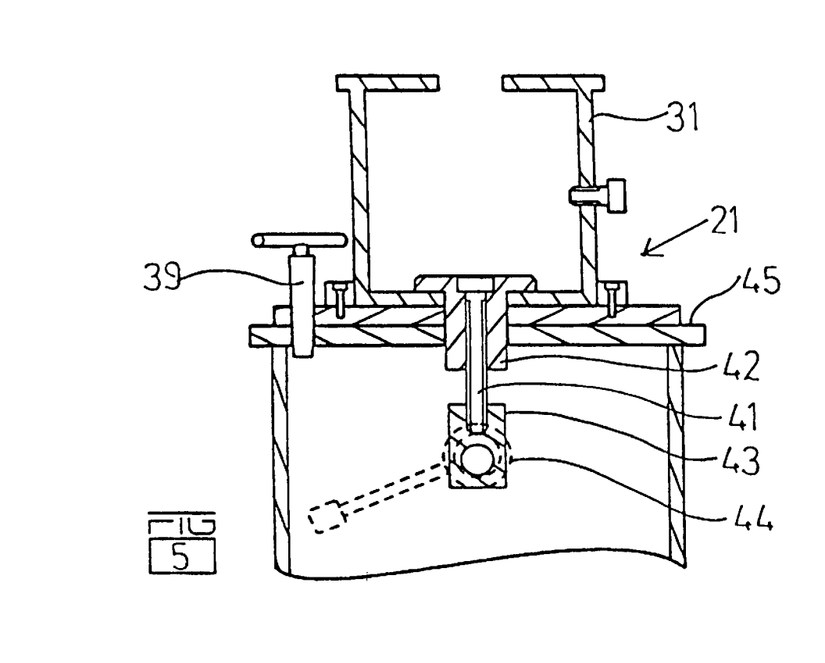
FIG. 5 is a cross-sectional view of part of the lathe.
Figure 6:
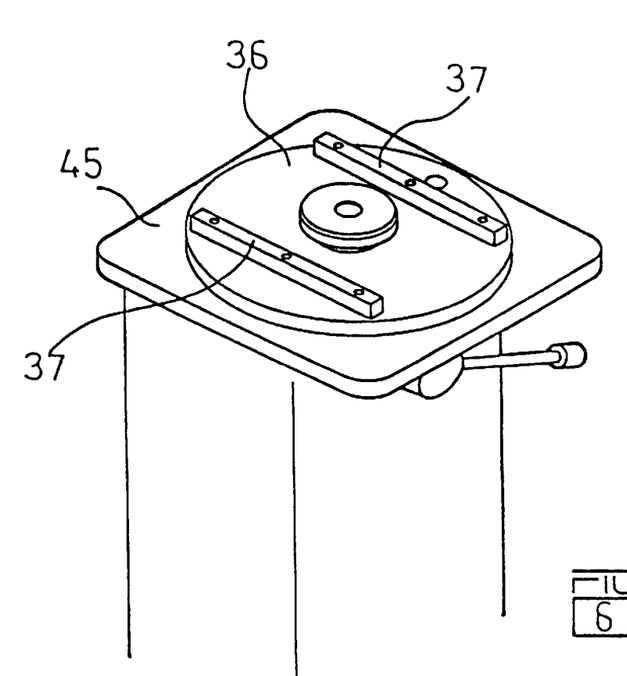
FIG. 6 is an isometric view of part of the lathe.
Figure 7:
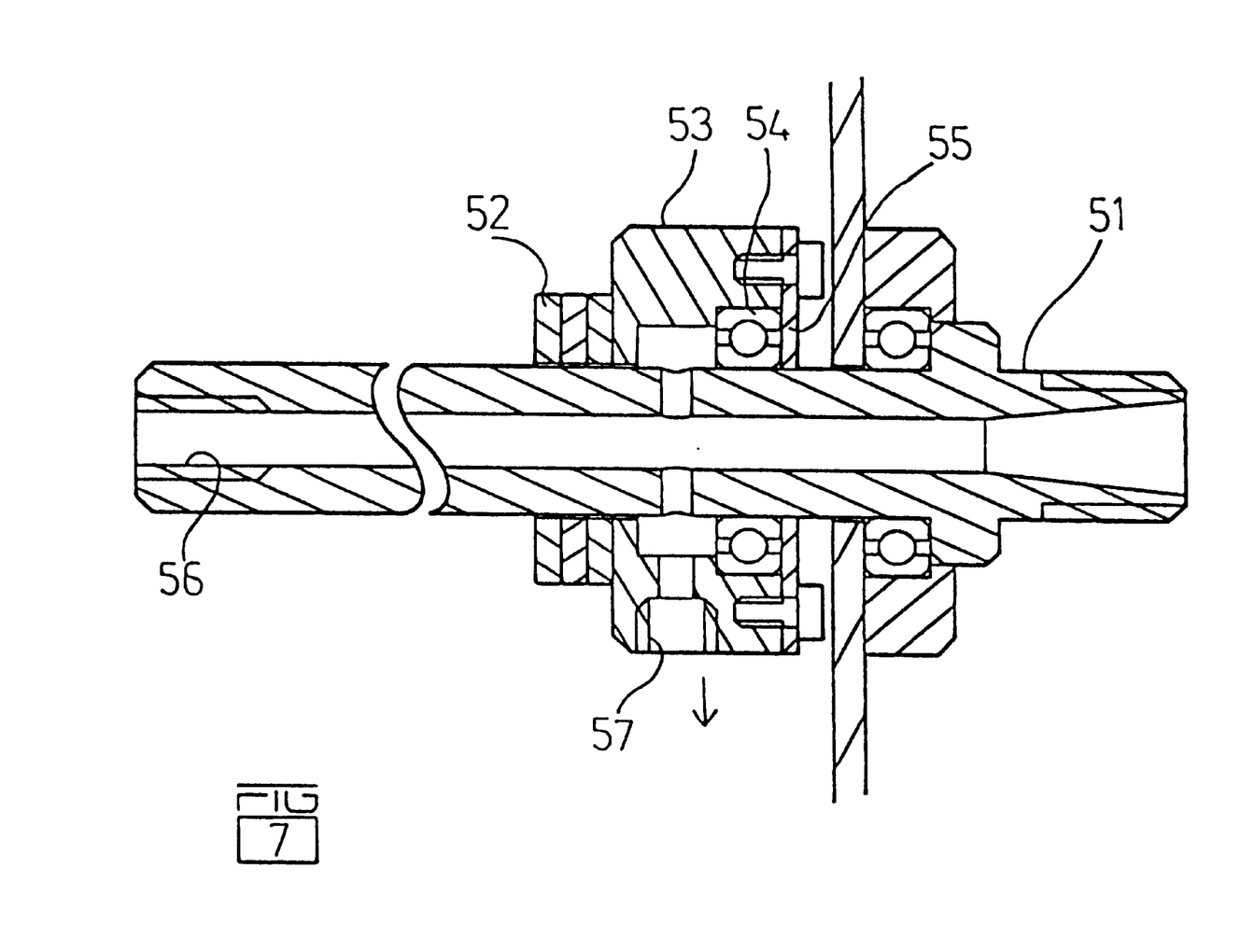
FIG. 7 is a cross-sectional view of pant of the lathe.

The rotary turntable is best seen in FIGS. 5 and 6 and is described in greater detail with respect thereto.

To the second column 4 is mounted a rotating table 36 which has its centre line coincident with the spindle second centre lines. That rotating table 36 can be held in position by means of a taper pin 39 and this is further assisted by the location dowel 27a.

The table 6 has guide ways 37 which will guide the linear movement of the bed 31.

The table 36 can be clampingly held by means of a clamp bolt 41 which co-operated with a clamp and pivot bush 42 via an eccentric yoke 43 and an eccentric shaft 44.

At the upper end of the second column 4 is a base plane 45 which is horizontal and parallel to the spindle centre lines in all planes.

Operation of the eccentric shaft 44 can be used to loosen or tighten the rotating table 36.

The head stock shown in the drawings can be used, if desired, to carry a vacuum plate but because of dangers associated with applying vacuum lines, the vacuum lines are located within the first column 3.

Figure 8:
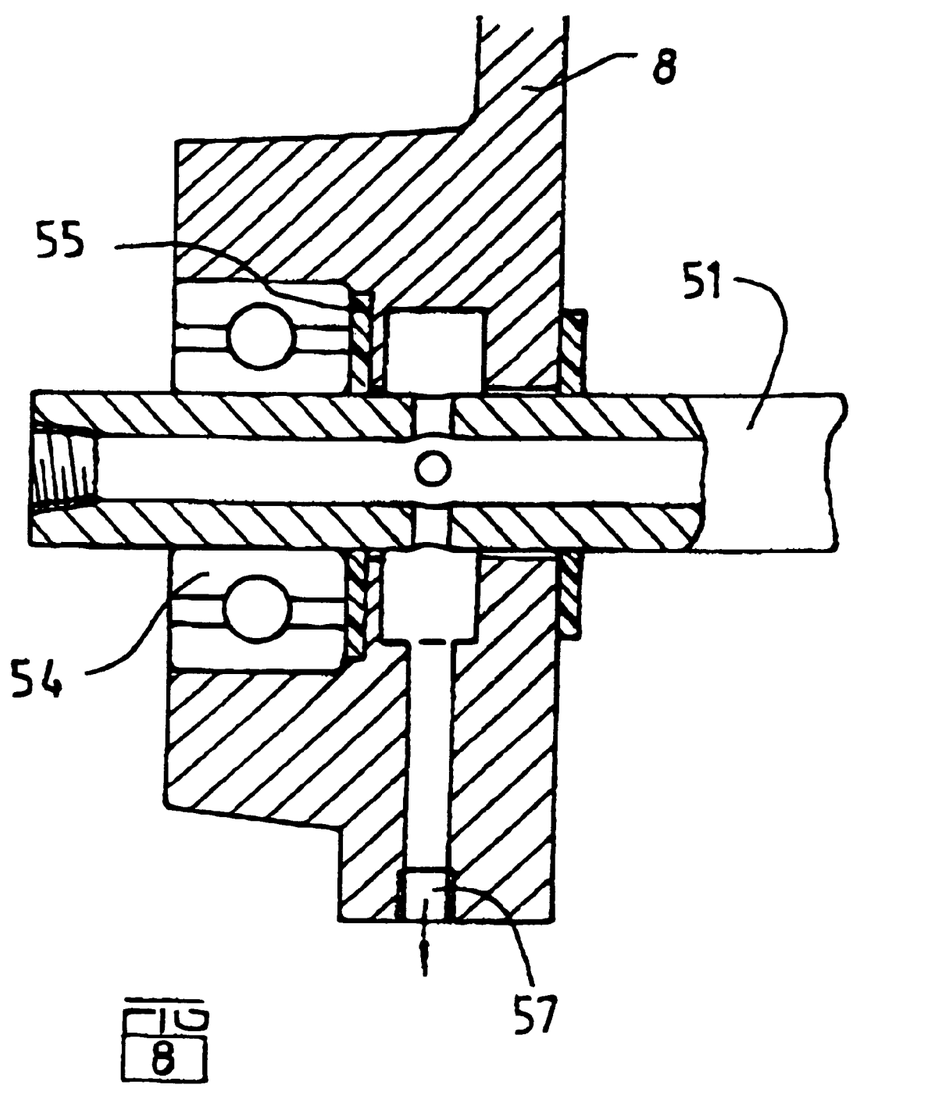
FIG. 8 is a cross-sectional view of the modified vacuum induction system.

Bores within the lathe spindle allow vacuum to be connected to the inside of the lathe spindle 51 mounted on bearings 54. To ensure against loss of vacuum, teflon retainer seals 55 are provided on both sides of the housing surfaces surrounding an annular vacuum chamber.

One end of the lathe spindle is provided with an internal thread for a restrictor orifice in a connector 57 which can control the magnitude of the vacuum and the other end of the spindle would be fitted with a conventional vacuum plate which might be required by a user when necessary.

Other aspects of the present invention which may be of interest or relevance are set out below.

The present design of the lathe provides for a rigid column for the head stock and a sliding swivelling bed supported on a rigid pedestal adjacent to the head stock.

The head stock and support pedestal are connected together on a common base plate and also by a beam mid way up the pedestal.

In one form the lathe utilises a sub-bed which is attached to the head stock and/or the sliding bed (2 sub-beds required).

The sliding bed is attached to the head stock fade at right angles in both vertical and horizontal planes by a lever and cam device which pulls the squared offend of the sliding bed hard against the machined face of the head stock column.

This cam lock is easily removed to allow the sliding bed to either slide to the right of the machine, thus extending the centre distance or, alternatively, allow the bed to be swung anywhere through 360° in the horizontal plane whilst resting on the flat top surface of the pedestal.

The bed may be solidly locked in any position by clamp bolt or cam lock.

This improvement to the normally available wood turning lathe enables bowls or discs of large diameter to be easily and safely machined on both inside and outside surfaces without removing them from the machine chuck or face plate thus permitting truly concentric work to be obtained with only one set up operation and maintaining safe work condition to support a workpiece with the tailstock.

This improvement to the normally available wood tuning lathe also makes it fully universal in that it can be used for both large disc or bowl turning safely and also for conventional spindle turning between centres without makeshift and unsafe adaptations.

The rotating and fully adjustable bed sections locations allows the tool rest to be adjusted and firmly located on a rigid base throughout 180° of large diameter, deep or shallow section work which is not safely achievable on any available wood turning lathe capable of both large bowl and disc turning and conventional spindle turning between centres.

The machine is mainly manufactured from readily available rolled steel sections and may be of cast iron, aluminium, composite plastic or combination of materials.

The reverse cam locking tool rest 26b for bowl turning has the locking handle at the opposite end to the normal currently available tool rest and therefore allows location of the tool rest support bar close to large diameter or face boring work.

This improves versatility and safety by providing a rigid support and guide to a cutting chisel allowing more intricate and accurate work detail and finish to be obtained by the user.

As a comparison, this invention has superior rigidity, safety and ease of operation combined with versatility when compared with other wood turning lathes currently available.

Finally it is to be understood that various alterations, modifications and/or additions may be incorporated into the various constructions and arrangements or parts without departing from the spirit and ambit of the invention.

What is claimed is:

1. A lathe including:
   a headstock comprising a lathe spindle;
   a tailstock; and
   a lathe bed wherein the lathe bed is mounted to be rotatable in a horizontal plane about a vertical axis and contains a centrally located groove along its longitudinal axis forming a track in which the tailstock can be slidably moved such that tailstock can be swivelled or rotated and then realigned with the tailstock to maintain a central working axis therebetween.

2. A lathe according to claim 1 wherein the lathe bed includes two symmetrical longitudinal halves bolted or welded together.

3. A lathe according to claim 1 including a rotatable turntable and wherein the lathe bed is slidably affixed to said rotatable turntable.

4. A lathe according to claim 3 wherein the lathe bed can be rotated up to 360° in a horizontal plane about a vertical axis.

5. A lathe according to claim 1 wherein the tailstock is slidably moveable along the lathe bed.

6. A lathe according to claim 1 which additionally contains an auxiliary bed.

7. A lathe according to claim 6 wherein the auxiliary bed has a cross-sectional configuration substantially identical with the lathe bed.

8. A lathe according to claim 6 wherein the auxiliary bed is mounted on the lathe bed.

9. A lathe according to claim 6 wherein the auxiliary bed in mounted on the headstock.

10. A lathe according to claim 8 wherein the auxiliary bed can be mounted on the lathe bed or headstock to extend at right angles to the plane of the lathe bed or headstock respectively.

11. A lathe according to claim 8 wherein the auxiliary bed can be mounted on the lathe bed or the headstock to extend along an axis parallel with a centerline of the headstock.

12. A lathe according to claim 1 which includes a tool rest.

13. A lathe according to claim 12 wherein the tool rest comprises a shank which is engageable within a tool slide.

14. A lathe according to claim 13 wherein the tool slide can be moved along the lathe bed and clamped into position.

15. A lathe according to claim 12 wherein the tool rest is lockably held in relative position to the tool slide.

16. A lathe according to claim 12 wherein the tool rest can be swivelled to alter its angle and can be raised or lowered to a desired operating position.

17. A lathe according to claim 1 wherein the headstock comprising a lathe spindle passing through a hollow column and within the hollow column means adapted to safely connect a vacuum to the interior of the lathe spindle.

18. A lathe according to claim 17 wherein the headstock includes a vacuum inlet port adapted to be connected to a vacuum source.

19. A lathe according to claim 1 wherein the vacuum inlet port is cast or machined into the headstock.

20. A lathe according to claim 19 wherein the vacuum inlet port comprises an annular groove.

21. A lathe according to claim 1 wherein the lathe spindle comprise cross holes at right angles through the spindle.

22. A lathe according to claim 21 wherein a bleed hole is fitted into an outer end of the lathe spindle.

23. A lathe according to claim 22 wherein when vacuum is applied the outer end of the lathe spindle is closed and vacuum is controlled by partially opening the closed end.

24. A lathe according to claim 23 wherein the lathe spindle is provided with a seal on its outer surface.

25. A lathe according to claim 24 wherein the seals are teflon annular discs, one on either housing surface.

26. A lathe according to claim 25 wherein there is no metal to metal contact between the lathe spindle and the hollow column.

27. A lathe according to claim 17 wherein all vacuum hoses are retained within the headstock.

28. A lathe as claimed in claim 17, wherein said hollow column mounts a connector for controlling the vacuum within said hollow column and within said lathe spindle.

29. A lathe including:
    a headstock comprising a lathe spindle passing through a hollow column and within the hollow column means adapted to safely connect a vacuum to the interior of the lathe spindle;
    a lathe bed wherein the bed is mounted to be rotatable in a horizontal plane about a vertical axis; and
    a tailstock adapted to rotate 360° through its normal central location to permit alignment with the headstock spindle axis regardless of angular location of the lathe bed about its vertical axis.

30. A lathe comprising:
    a first column;
    a head stock mounted to the first column;
    a second column;
    a bed mounted to the second column;
    a tail stock mounted to the bed;
    means connecting the first and second columns;
    and wherein the bed is mounted to the second column to be rotatable in a horizontal plane about a vertical axis.

31. A lathe as claimed in claim 30, wherein the bed is constructed and arranged to be rotated within at least 90° and up to at least over 360°.

32. A lathe as claimed in claim 30, wherein the bed is mounted to move translationally in said horizontal plane towards and away from the first column.

33. A lathe as claimed in claim 30, wherein the first column is provided with locating means adapted to locate the bed in a particular relation to the first column.

34. A lathe as claimed in claim 30, wherein the bed is mounted to the second column by bed mounting means adapted to rotate about a vertical axis.

35. A lathe as claimed in claim 30, wherein releasable means is provided to hold the bed mounting means in a selected rotated position about the vertical axis.

36. A lathe as claimed in claim 34, wherein the bed mounting means comprises guides for guiding the bed in such translational movement.

37. A lathe as claimed in claim 30, wherein releasable means is provided to hold the bed against such translational movement.

38. A lathe as claimed in claim 30, wherein an auxiliary bed is provided which can be mounted to the first mentioned bed.

39. A lathe as claimed in claim 30 wherein an auxiliary bed is provided which can be mounted to the headstock or the lathe bed.

40. A lathe as claimed in claim 38, wherein the auxiliary bed can be mounted to extend at about right angles to the length of the first mentioned bed, parallel with spindle centreline axis.

41. A lathe as claimed in claim 30, wherein an auxiliary bed is provided which can be mounted to the first column.

42. A lathe as claimed in claim 40, wherein the auxiliary bed can be mounted to extend at about right angles to a plane including the head stock.

43. A lathe as claimed in claim 30, wherein the first column is demountable from the means connecting the first column and the second column.

44. A lathe as claimed in claim 30, wherein a stand is provided to which the means connect the first column and the second column is demountably attached.

* * * * *